3,057,814
VINYL CHLORIDE POLYMERS PLASTICIZED WITH HYDRONOPYL PINONATE

Glen W. Hedrick, Lake City, Fla., and Frank C. Magne, New Orleans, La., assignors to the United States of America as represented by the Secretary of Agriculture
No Drawing. Filed Mar. 29, 1960, Ser. No. 18,457
1 Claim. (Cl. 260—31.2)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to plasticizers for vinyl chloride polymers. More particularly, the invention provides plastic compositions comprising polymers and copolymers of vinyl chloride plasticized with esters of pinonic acid.

Pinonic acid is a keto terpenic acid—2,2-dimethyl-3-acetylcyclobutane acetic acid—derivable from turpentine by procedures well-known to those familiar with naval stores products. Prior workers have produced lower alkyl and some other types of esters of pinonic acid. Many of the pinonic acid esters heretofore produced, e.g., those disclosed in U.S. Patents 2,679,461 and 2,679,509 are solvent plasticizers for hydrophilic vinyl resins, such as the polyvinyl acetal resins.

A compound which is a solvent plasticizer for, and thus is compatible with, a hydrophilic vinyl resin such as a polyvinyl acetal resin, normally exhibits only a very limited compatibility with a hydrophobic vinyl resin such as polyvinyl chloride. If a resin is plasticized with a compound with which it has only a limited compatibility the plasticizer soon "bleeds out," unless the plasticizer is used in limited amount, or is used in conjunction with a mutual solvent to obtain adequate compatibility.

We have discovered certain esters of pinonic acid which exhibit good compatibility with vinyl chloride resins. The term "vinyl chloride resin" or "vinyl chloride polymer" is used through the specification and claim to refer to polymers and copolymers of monomers containing vinyl chloride in a predominant proportion in parts by weight.

A primary object of the present invention is to provide unique esters of pinonic acid which are excellent solvent plasticizers for vinyl chloride resins, and which are plasticizers that can be economically produced from a terpene carboxylic acid, a product derivable from plentiful and inexpensive naval stores products. A further object is to provide plastic compositions comprising mixtures of vinyl chloride polymers and said unique esters of pinonic acid. Another object is the production of plastic compositions which have adequate low temperature performance. Still another object is the development of compositions resistant to attack by fungi.

Pinonic acid suitable for use in preparing the esters of the present invention can be conveniently obtained from alpha-pinene, a major constituent of gum turpentine, by oxidation with potassium permanganate or ozone, as is well-known to those familiar with naval stores products. Crude pinonic acid preparations consisting of a mixture of cis and trans isomers, or pure preparations consisting of single isomers of pinonic acid may be used. The amount and nature of optically active forms present in the preparations will depend upon the composition of the particular alpha-pinene employed.

Among the alcohols suitable for esterifying pinonic acid to produce the esters of the present invention which are useful as solvent plasticizers for vinyl chloride resins are included the following: monohydric aliphatic alcohols whose carbon chains have from 8 to 13 carbon atoms, dihydric aliphatic alcohols, trihydric aliphatic alcohols, tetrahydric aliphatic alcohols, and cycloaliphatic alcohols wherein the cyclic ring is saturated and separated from the hydroxyl group by methylenic groups. Examples of suitable esterifying alcohols are isooctyl alcohol, decyl alcohol, lauryl alcohol, tridecyl alcohol, ethylene glycol, gycerol, pentaerythritol, and hydronopol.

The esterification of the pinonic acid to produce the esters of the present invention can be carried out using conventional esterification procedures, such as refluxing and removing water by excess inert organic solvent. However, we have discovered that esterification reactions involving pinonic acid are extremely sensitive to esterification catalyst concentration by reason of the unstability of pinonic acid in the presence of the acid catalysts customarily employed for the esterification of organic acids. We have discovered, as will be shown later, that yields of pinonic acid esters approaching the theoretical can be achieved by the use of para toluene sulfonic acid as the acid catalyst and by the careful control of the catalyst concentration to an amount ranging from about 5 to 15 grams of the para toluene sulfonic acid catalyst for each equivalent weight of the pinonic acid. Both the yield of esters and the esterification reaction rate are markedly improved by the method which is the subject of this invention. Both yield of ester and esterification reaction rate as achieved by our method show decided improvement over those obtained by the prior art processes for preparing the aliphatic esters of pinonic acid. Suitable solvents include toluene, benzene, p-cymene, carbon tetrachloride, and chloroform. Under the preferred esterification conditions, using a solvent such as toluene, essentially complete esterification of the pinonic acid can be achieved in about 2 hours' reaction time with a usual yield of crude ester of about 90 to 95 percent of theory. With lower boiling solvents, the esterification reaction is slower, requiring a reflux period of up to about 24 hours. Following the esterification, the crude ester can be isolated and purified by the usual washing and distillation procedures.

The esters of pinonic acid provided by this invention exhibit good compatibility with polymers and copolymers of monomers predominating in vinyl chloride, such as polyvinyl chloride, and the vinyl chloride-vinyl acetate copolymers predominating in vinyl chloride. They can be employed as plasticizers in proportions of from about 10 to 80 parts by weight per 100 parts by weight of polymer. The plastic compositions comprising the mixtures of vinyl chloride polymers and esters of pinonic acid are capable of withdrawing low temperatures. In addition, they are resistant to attack by fungi, such as *Aspergilus niger* and *Aspergillus oryzae*, which are known to attack many of the plasticizers used in prior art types of plastic compositions.

The following example is illustrative of certain details of the invention. The pinonic acid employed to prepare the esters cited in the example was a "crude" pinonic acid preparation, consisting of cis and trans-d, l-pinonic acid, and cis and trans-d or l-pinonic acids.

EXAMPLE 1

The following general esterification procedure was used to prepare the series of esters of pinonic acid whose physical properties are tabulated in Table I.

One equivalent (184 g.) of pinonic acid was dissolved in 600 cc. of toluene containing 1 equivalent of the esterifying alcohol (i.e., gram molecular weight of the alcohol/no. of alcoholic hydroxyls) and 10 g. of p-toluene sulfonic acid monohydrate. The solution was heated to reflux, and refluxing was continued, while removing water by azeotropic distillation, until the esterification was 95 to 100 percent complete as evidenced by the acid number of the solution. About 2 hours' reaction time was generally sufficient. After washing first with water, then with 5 percent sodium carbonate solution, the product was distilled twice through an 18-inch Vigreaux column. Since distillation of the glycerol ester and the pentaerythritol ester was not possible, these two esters were decolorized with charcoal and stripped of solvent at 200° C. and 0.5 mm. mercury pressure. The yields on the crude esters were 90 to 95 percent of theory.

*Table I*

EFFECT OF p-TOLUENE SULFONIC ACID (PTS) ON CIS-dl-PINONIC ACID [1]

| Pinonic Acid | PTS, q. | Toluene, ml. | N.E. Residual Acid |
|---|---|---|---|
| 92 g., 0.5 mole | 2½ | 300 | 184 |
|  | 5 | 300 | 215 |
|  | 10 | 300 | 422.4 |
|  | 15 | 300 | 1,110 |

[1] 38 hrs., 115° C.

*Table II*

DECYL PINONATE YIELDS USING VARYING AMOUNTS OF CATALYST, p-TOLUENE SULFONIC ACID [1]

| PTS, q. | Time, Hrs. | Temperature, ° C. | Decyl Alcohol (Moles) | Toluene, Ml. | Yield Grams | Yield Percent |
|---|---|---|---|---|---|---|
| 0 | 11 | 242 | 1.0 | 0 | 137 | 84 |
| 2½ | 2¼ | 115 | 0.5 | 300 | 151 | 92 |
| 7½ | 2½ | 115 | 0.5 | 300 | 147 | 90 |
| 15 | 2¼ | 115 | 0.5 | 300 | 136 | 83 |

[1] PTS.
(Pinonic acid 92 g., 0.5 mole used in each experiment.)

Each pinonate ester of Table III was compared with di(2-ethylhexyl)phthalate, "DOP," as the plasticizer in a standard formulation comprising: 63.5% of a vinyl chloride-vinyl acetate (95–5) copolymer, 35% plasticizer, 0.5% stearic acid, and 1.0% basic lead carbonate. The formulations were milled and molded at 310° F. The results are given in Table IV.

*Table IV*

| Plasticizer | Compatibility | Tensile Strength, p.s.i. | 100% Modulus, p.s.i. | Elongation, Percent | Brittle Point, ° C. |
|---|---|---|---|---|---|
| Lauryl pinonate | Good | 2,730 | 1,430 | 320 | −41 |
| Tridecyl pinonate | Good | 2,870 | 1,490 | 350 | −29 |
| Isooctyl pinonate | Good | 2,770 | 1,240 | 340 | −27 |
| Decyl pinonate | Good | 2,780 | 1,260 | 340 | −31 |
| Octadecyl pinonate | (1) | (1) | (1) | (1) | (1) |
| Hydronopyl pinonate | Good | 3,120 | 2,090 | 330 | +1 |
| Ethylene glycol dipinonate | Good | 3,230 | 2,050 | 300 | −1 |
| Glycerol tripinonate | Good | (2) | (2) | (2) | (2) |
| Pentaerythritol pinonate | Good | (2) | (2) | (2) | (2) |
| DOP | Good | 3,030 | 1,630 | 300 | −33 |

[1] Incompatible—cannot mill.
[2] Stocks too stiff to test.

All of the plasticizers, except the octadecyl pinonate, exhibited good compatibility with the vinyl chloride copolymer. The plastic compositions were observed over a 5 months' period, and there was no "bleeding" or exudation of plasticizer from any of them within this period.

The two plastic compositions containing the lauryl pinonate and the tridecyl pinonate were tested for their resistance to the growth of fungi *Aspergillus niger* and *Aspergillus oryzae* according to the test method of Vicklund and Manowitz (R. E. Vicklund and M. Manowitz, Engineer Research & Development Laboratories, Fort Belvoir, Virginia, "Fungicides for Use in Paints," Report 1118, April 1949), using an unplasticized specimen and a DOP-plasticized specimen as controls. Both of these controls are known to be resistant to attack by these fungi. The two plastic compositions were as resistant to the growth of the two test organisms as were the controls, little growth being observed on any of the test specimens. This establishes that the pinonic acid esters are not attacked by fungi which are known to attack many other types of plasticizers.

Lauryl pinonate and tridecyl pinonate were also compared with DOP as the plasticizer in a standard formulation comprising: 63.5% of a polyvinyl chloride homopolymer, 35% plasticizer, 0.5% stearic acid, and 1.0% basic lead carbonate. The formulations were milled and molded at 310° F. The results are given in Table V.

*Table III*

ESTERS OF PINONIC ACID AND THEIR PHYSICAL PROPERTIES

| Ester | Boiling Point ° C. | Boiling Point mm. Hg | Density, $d_4^{20}$ | Refractive Index, $n_D^{20}$ | Molecular Refraction Found | Molecular Refraction Calculated |
|---|---|---|---|---|---|---|
| Lauryl pinonate | 172–192 | 0.4 | 0.9223 | 1.4601 | 104.55 | 104.13 |
| Tridecyl pinonate | 165–171 | 0.2 | 0.9313 | 1.4522 | 108.08 | 108.77 |
| Isooctyl pinonate | 165–172 | 0.9 | 0.9495 | 1.458 | 85.07 | 85.52 |
| Decyl pinonate | 147–148 | 0.4 | 0.9388 | 1.459 | 94.49 | 94.83 |
| Octadecyl pinonate | 218–227 | 0.6 | 0.8947 | 1.4565 | 132.59 | 132.01 |
| Hydronopyl pinonate | 170–175 | 0.5 | 1.0101 | 1.4872 | 95.134 | 95.41 |
| Ethylene glycol dipinonate | 220–225 | 0.3 | 1.0726 | 1.4781 | 103.25 | 103.33 |
| Glycerol tripinonate |  |  | 1.1029 | 1.4865 | 153.69 | 154.11 |
| Pentaerythritol pinonate |  |  | 1.1131 | 1.4948 | 209.50 | 209.24 |

Table V

| Plasticizer | Characteristics of Plastic Compositions | | | | |
|---|---|---|---|---|---|
| | Compatibility | Tensile Strength, p.s.i. | 100% Modulus, p.s.i. | Elongation, Percent | Brittle Point, °C. |
| Lauryl pinonate | Good | 2,820 | 1,480 | 330 | −39 |
| Tridecyl pinonate | Good | 3,050 | 1,580 | 350 | −31 |
| DOP | Good | 3,090 | 1,740 | 330 | −35 |

The plastic compositions were observed over a 5 months' period, and there was no bleeding or exudation of plasticizer from any of them within this period.

We claim:

A plastic composition which is stable against exudation of plasticizer comprising a mixture containing a vinyl chloride polymer selected from the group consisting of polyvinylchloride and a vinyl chloride-vinyl acetate copolymer which contains a predominant amount of vinyl chloride copolymerized therein, and as a plasticizer therefor hydronopyl pinonate, said plasticizer being present in the proportion of about from 10 to 80 parts per 100 parts of the vinyl chloride polymer.

References Cited in the file of this patent

UNITED STATES PATENTS

| | | |
|---|---|---|
| 2,249,768 | Kropa | July 22, 1941 |
| 2,517,350 | Reid | Aug. 1, 1950 |
| 2,679,461 | Hasselstrom | May 25, 1954 |
| 2,679,509 | Hasselstrom | May 25, 1954 |